United States Patent [19]
Tkaczyk et al.

[11] Patent Number: 6,140,730
[45] Date of Patent: Oct. 31, 2000

[54] HIGH EFFICIENCY ELECTRIC GENERATOR FOR MECHANICALLY POWERED ELECTRONIC EQUIPMENT

[75] Inventors: John Eric Tkaczyk, Delanson; Gerald Burt Kliman, Niskayuna; Jerome Johnson Tiemann, Schenectady, all of N.Y.

[73] Assignee: General Electric Company, Schenectady, N.Y.

[21] Appl. No.: 09/192,463

[22] Filed: Nov. 16, 1998

[51] Int. Cl.$^7$ ...................................................... H02K 5/04
[52] U.S. Cl. ............................................ 310/181; 310/268
[58] Field of Search ...................................... 310/156, 261, 310/264, 265, 267, 268, 112, 154, 166, 168, 67 R, 181; 29/596–598

[56] References Cited

U.S. PATENT DOCUMENTS

| | | | |
|---|---|---|---|
| 4,733,120 | 3/1988 | Kawabe | 310/268 |
| 5,204,569 | 4/1993 | Hino et al. | 310/154 |
| 5,289,072 | 2/1994 | Lange | 310/266 |
| 5,646,467 | 7/1997 | Floresta et al. | 310/268 |
| 5,684,352 | 11/1997 | Mita et al. | 310/156 |
| 5,864,198 | 1/1999 | Pinkerton | 310/266 |
| 5,977,684 | 11/1999 | Lin | 310/268 |
| 5,982,070 | 11/1999 | Caamano | 310/216 |
| 5,990,584 | 11/1999 | Luo et al. | 310/36 |

FOREIGN PATENT DOCUMENTS 2304208A 3/1997 United Kingdom.

*Primary Examiner*—Nestor Ramirez
*Assistant Examiner*—Tran N. Nguyen
*Attorney, Agent, or Firm*—Marvin Snyder; Douglas E. Stoner

[57] ABSTRACT

A generator for producing electricity at high efficiency from mechanical energy includes a housing, a shaft mounted in the housing, an electrical coil positioned about the shaft and an annular, anisotropic magnet positioned about the shaft adjacent the coil. The magnet has a plurality of circumferentially distributed, alternating magnetic poles. Ferromagnetic flux plates are operatively associated with the magnet and the coil for establishing an alternating magnetic field through the coil as a function of rotation of at least one of the magnets, the coil and the flux plates.

10 Claims, 4 Drawing Sheets

HIGH EFFICIENCY ELECTRIC GENERATOR FOR MECHANICALLY POWERED ELECTRONIC EQUIPMENT

BACKGROUND OF THE INVENTION

The present invention relates to electric power generators and, more particularly, to a mechanically powered electric power generator.

There is currently an increased interest in electrically powered devices, such as radios and flashlights, which can be energized by manual or mechanical power input. Such devices are desirable in emergency situations or in remote locations where neither batteries nor electricity are readily available. U.K. published Patent Application No. 2,304, 208A discloses one such power generator system using mechanical power from a wind-up spring to drive a small electric power generator through a gear train for providing electric power to a radio. In addition, applicants are aware of a commercially available flashlight which incorporates an alternating current (ac) generator having a flywheel that can be spun by a ratchet and gear assembly coupled to a finger operated, reciprocating trigger mechanism.

One problem characteristic of these exemplary mechanically powered electric generators is that the mechanical to electrical power conversion efficiency is limited by the relatively slow motion of the mechanical power input, i.e., the speed at which a person can repetitively squeeze a trigger or how quickly a spring can unwind under load. Power conversion in an electric power generator using ferromagnetic elements is based on Faraday's law which relates the electromotive force to the time rate of change of magnetic induction. The higher the frequency of magnetic field change in a coil, the higher the voltage generated at the coil terminals. The peak-to-peak voltage developed across a rotating coil in a generator is given by $V=k\omega=(PnBA)\omega$, where $k=PnBA$ is called the torque constant, P is the number of poles, $\omega=2\pi f$ is the angular frequency, n is the number of turns in the coil, B is the magnetic induction field being cut by turns of the coil, and A is the area of the coil. For a 1 cm² area coil where B=0.1 T, n=100 turns, and P=2 poles, obtaining an output voltage V=10 volts requires a frequency f of 800 Hz. The frequency requirement can be lowered if the number of turns is increased, but this is limited by the increased resistance of the wire which results in ohmic losses.

The frequency requirement is onerous since the frequency of repetitive human motion under load is generally limited to less than 10 Hz, and 1 Hz is more typical if significant torque (higher load) is to be delivered. This limitation makes it difficult to maintain operation of, for example, a trigger driven flashlight for extended periods. Slower repetition can allow the time to be extended by stepping up the effective mechanical frequency to a higher frequency by use of a gear train with a 100 to 1 or 1000 to 1 ratio. The difficulty is that beyond 100:1, there are significant frictional losses in the moving parts of such gear trains. A similar problem exists with spring motors in that the time for the spring to unwind can be extended by use of a gear train but the gear train adds frictional losses. Accordingly, it would be advantageous to have a generator which operated efficiently at a lower frequency.

SUMMARY OF THE INVENTION

In general, improved electrical performance can be achieved in a mechanically powered electric generator without increased mechanical effort by using anisotropic magnets rather than isotropic magnets. Additionally, further improvements can be obtained by structural modification of the electric generator. In one form, an improved generator incorporates a rotating flux plate in juxtaposition with an annular, stationary anisotropic magnet having a wound coil positioned in the magnet center opening about a rotatable shaft. A pair of ferromagnetic flux plates each having a plurality of radially extending, circumferentially spaced arms are positioned on opposite sides of the magnet-coil assembly and arranged to rotate concurrently with respect to the magnet and coil so as to establish an alternating magnetic field in the coil. This arrangement reduces rotating mass but uses only one-half the available area at any one time. Another embodiment overcomes the magnet area limitations by stacking the coil and magnet and fixing a ferromagnetic backing plate to a surface of the magnet opposite the coil facing surface. Two flux plates are affixed to the coil, which is stationary, and the magnet is rotated to create a changing flux through the alternating arms of the flux plates, thus using all of the magnet area. Still another form uses two coils on opposite sides of the magnet, with each coil having a pair of flux plates. This latter embodiment uses all poles of the magnet and allows the coils to be connected in series to effectively double the available voltage.

BRIEF DESCRIPTION OF THE DRAWINGS

FIG. 1 shows the construction of one form of prior art ac generator 10 for a manually powered appliance such as a radio. The generator employs an isotropic ferrite magnet 12 with eight radially-directed magnetic poles (N-S) spaced around the circumference and includes a coil 14 axially spaced from magnet 12. Magnet 12 and coil 14 are both positioned about a shaft 16. Coil 14 and shaft 16 are stationary. Shaft 16 is seated at each end in a pair of stub axle supports 18 and 20, which are affixed to a frame or housing 22. Coil 14 is annular and seats about axle support 18. Axle support 18 may be comprised of plastic, with a sleeve 24 of ferromagnetic material fitted about support 18. Magnet 12 is seated on a sleeve-type bearing 26 riding on shaft 16, allowing the magnet to be rotatable with respect to coil 14.

Figure 2:
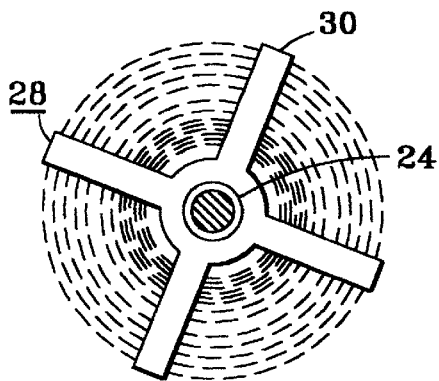
FIGS. 2 and 3 are top and bottom plan views, respectively, of armature 28, taken along lines 2—2 and 3—3, respectively, of FIG. 1.
Figure 3:
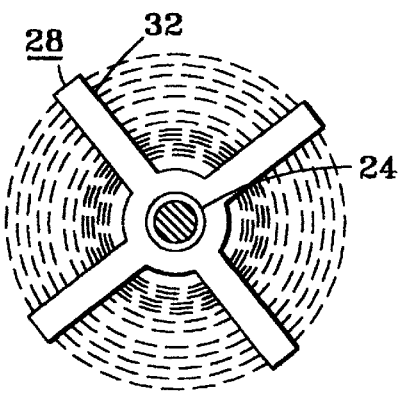

A flywheel (not shown) is also rotatably mounted on shaft 16 between magnet 12 and support 20, with the flywheel being coupled in driving engagement with magnet 12. The flux from the magnetic poles of magnet 12 is linked through the center of coil 14 by a steel armature 28 constructed from sheet stock which has been stamped and bent into an appropriate shape. As best seen in the respective top and bottom plan views of FIGS. 2 and 3, armature 28 is actually constructed from three pieces that are mechanically and magnetically connected, and comprise top and bottom plates 30 and 32, respectively, having radially directed arms extending from steel sleeve 24 at the center around which coil 14 is wound.

Figure 4:
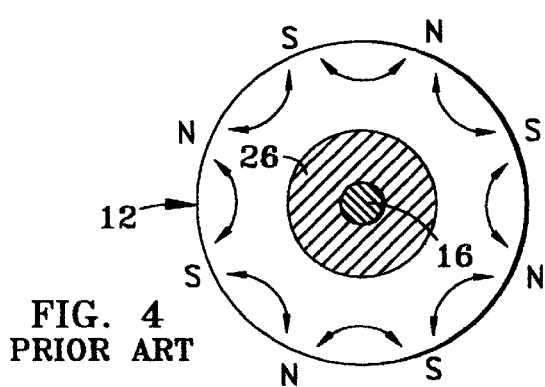
FIG. 4 is a bottom plan view of magnet 12, taken along line 4—4 of FIG. 1.

Magnet 12 has eight poles of alternating polarity, indicated by S (south) and N (north) as shown in FIG. 4, and flux plates 30 and 32 have four arms each. Arms of top plate 30 are longer than those of bottom plate 32 in order to allow the top plate arms to bend around the outside of coil 14 and extend to reach over the magnet poles. In this prior art example, the dimensions of coil 14 are approximately: w=2.3 mm axial thickness; a=6 mm inside diameter; and b=23 mm outside diameter. The coil wire is #33 gauge copper wire having a resistance of 0.676 ohms per meter. The total length of wire in coil 14 is about 21 meters and the total resistance is about 14.3 ohms. The diameter of the insulated wire is about 0.2 mm. Assuming a non-optimum packing so that coil density $D^2$ is about 0.95, the number of turns in the coil, obtained from the formula $N=w(b-a)/D^2$, is 490.

The magnetic field in gap 35 between magnet 12 and steel armature plate 32 is about 0.14 tesla (T). To a crude approximation, the gap magnetic field $B_g$ is related to the residual induction $B_r$ of magnet 12 approximately as the ratio of air gap length $L_g$ to magnet length $L_m$ between poles, i.e., $B_g \sim B_r(1-L_g/L_m)$. For isotropic ferrite, $B_r$=0.2 T and the lengths of magnet 12 are approximately, $L_g$=1 mm and $L_m$=9.4 (i.e., ⅛ of the circumference of the magnet). These values overestimate the flux by about 25% since leakage and potential loss are not considered.

There are four arms in each armature plate 30 and 32, with area of contact with the magnet pole of $2.2 \times 10^{-5}$ m² each. The total flux conducted through the coil is $(4 \times 0.14$ T$) \times (2.2 \times 10^{-5}$ m²$)$. If the magnet rotates at 1500 RPM (f=25 Hz or 25 revolutions per second, ω=157 rad/Hz), the peak to peak voltage is given by $V=P\omega nBA=8(157 \text{ HZ}) \times (490 \text{ turns}) \times (4 \text{ arms} \times 0.14 \text{ T}) \times (2.2 \times 10^{-5} \text{ m}^2)$ or approximately 8 volts. It would be advantageous to provide a manually powered generator of this form which produces higher output power with the same perceived manual effort, or which produces this same power with less perceived manual or mechanical effort that is more in line with human ability to produce repetitive motion or with mechanical spring capability to produce continuous motion.

DETAILED DESCRIPTION OF THE INVENTION

Figure 5:
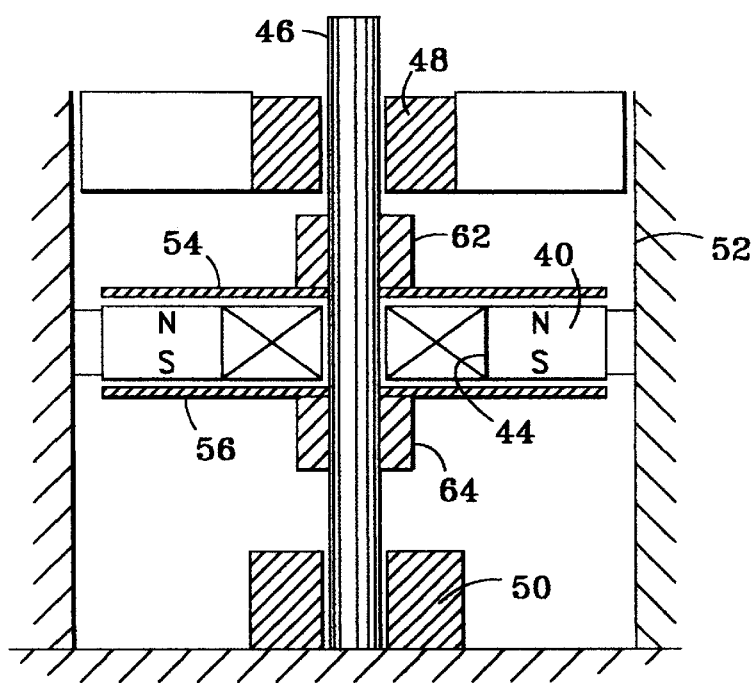
FIG. 5 is a schematic, cut-away side view of an ac generator in accordance with a preferred embodiment of the invention.

In the embodiment of the invention shown in FIG. 5, an electric power generator employs an anisotropic ferrite magnet 40. Such magnet is formed from a ferrite material using pressure and an aligned magnetic field during manufacture to create a magnet having a preferred magnetic axis. In a disk-shaped magnet, the magnetic axis is oriented along the axial direction since it is easier to apply pressure axially. A ferrite anisotropic magnet has about a factor of two higher induction than an isotropic magnet and about 3.5 times the energy product, the energy product being the product of coercivity and magnetic flux. Magnet 40 is annular in shape and has axially-oriented magnetic poles distributed circumferentially. A wound coil 42 is seated in a central, open core region 44 of magnet 40 about a shaft 46 supported for rotation in a pair of spaced bearing members 48 and 50. Bearing members 48 and 50 are mounted in a housing 52, along with magnet 40 and coil 42, i.e., both magnet 40 and coil 42 are affixed to the housing. The polarity of magnetic flux applied to coil 42 is cycled by ferromagnetic means comprising a pair of ferromagnetic flux plates 54 and 56 positioned adjacent opposite surfaces of the coil and magnet assembly and attached to shaft 46 for rotation therewith.

Figure 6:
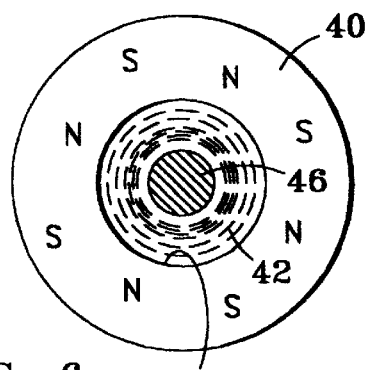
FIG. 6 is a top plan view of magnet 40, shown in FIG. 5.
Figure 7:
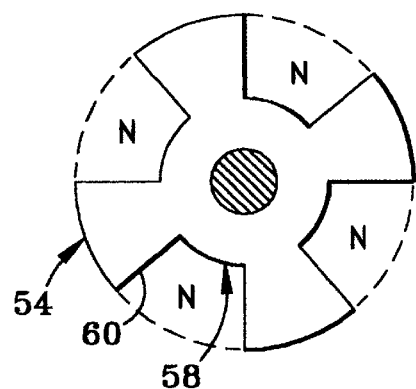
FIG. 7 is a top plan view of flux plate 54, shown in FIG. 5, relative to magnet 40.
Figure 8:
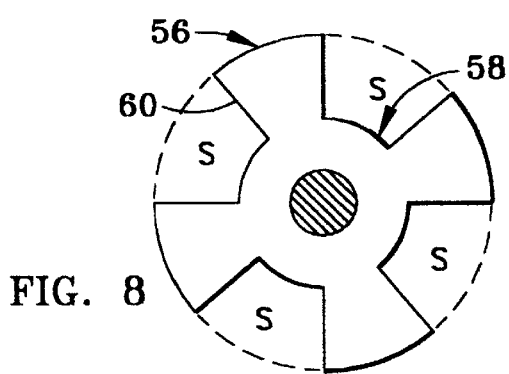
FIG. 8 is a bottom plan view of flux plate 58, shown in FIG. 6, relative to magnet 40.

As shown in FIG. 6, annular magnet 40 circumscribes central coil 42 and generator shaft 46. Magnet 40 has a plurality of alternating magnetic poles N and S (eight in the illustrated embodiment). Each pole at a radial location on one side of the magnet is of opposite polarity to a corresponding pole at the same radial location on the opposite side of the magnet. Thus, if each pole of one polarity on one surface of magnet 40 is covered or overlayed by one of the flux plates, such as flux plate 54 overlaying the S poles on the top surface as shown in FIG. 7, and flux plate 56 simultaneously overlays each pole of the opposite polarity as shown by flux plate 56 overlaying the bottom surface of magnet 40 in FIG. 8, then coil 42 is exposed to a uniform magnetic field of one polarity. For this purpose, flux plates 54 and 56 are each formed with a central annular portion 58 from which a plurality of arms 60 extend. The number of arms 60 is determined by the number of like poles since one set of like poles is covered by an arm. The diameter of annular portion 58 should be less than the diameter of central opening 44 in magnet 40 so that no flux path is formed between adjacent poles on a surface of the magnet. In this embodiment, shaft 46 provides a flux path through the center of coil 42 and each plate 54 and 56 is firmly affixed to the shaft. In addition, each plate 54 and 56 includes respective extending annular pieces 62 and 64 (FIG. 5) to improve flux transfer to shaft 46 by lowering the effective reluctance in the path.

Figure 1:
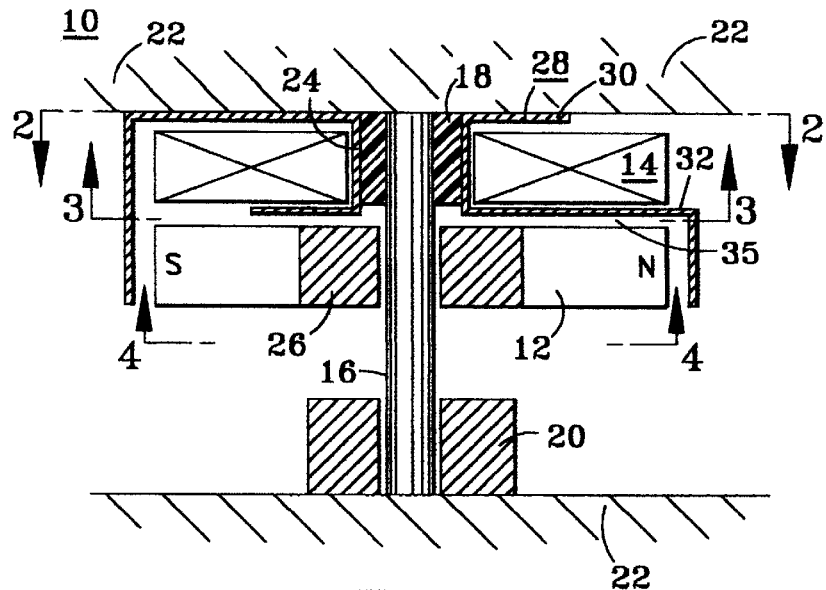
FIG. 1 is a schematic, cut-away side view of a known ac generator for a manually powered appliance, such as a radio.

Since magnet 40 and coil 42 are fixed with respect to housing 52, and since flux plates 54 and 56 are affixed to shaft 46, the flux plates rotate with respect to the magnet/coil assembly and alternately cover poles of one of the other polarity so that the magnetic flux coupled into coil 42 is of alternately changing polarity so as to generate an electric current in the coil. However, at any one moment only half of the available magnet area is in use. One way to make use of the total magnet area would be to have penetration of the flux plates at the outer diameter of the coil; however, this would result in a complicated structure. Moreover, the embodiment of FIG. 5 likely limits the magnet thickness to about 5 mm, so that the air gap would represent a larger load than would the air gap in a system having an axially spaced magnet and coil such as in the system of FIG. 1. Nevertheless, the embodiment of FIG. 5 has a larger effective magnet area and the use of an anisotropic magnet allows for a substantial increase in the torque constant, as compared to generators such as shown in FIG. 1.

Figure 9:
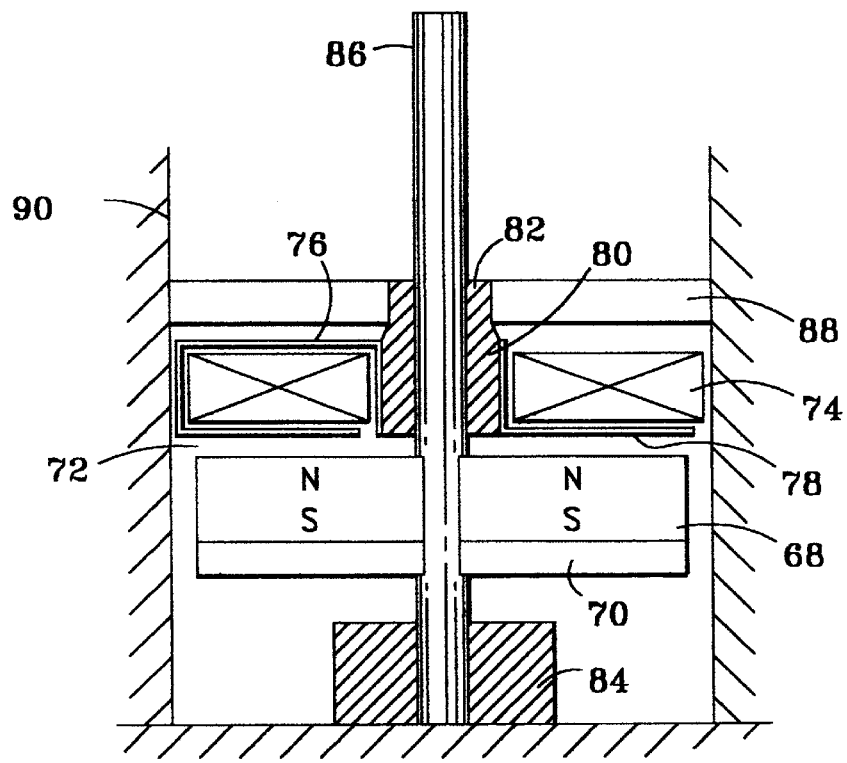
FIG. 9 is a schematic, cut-away side view of an ac generator in accordance with another preferred embodiment of the invention.

In the embodiment of FIG. 9, the available flux from an anisotropic magnet, such as magnet 68, is better used by backing up the magnet with a solid steel (ferromagnetic) backing plate or flux plate 70. This embodiment still uses only eight free poles, but the thickness of the magnet is effectively doubled by plate 70. If air gap 72 is 1 mm and magnet 68 is 5 mm thick, the effect of using plate 70 to produce an effective thickness of 10 mm results in about a 10% increase in flux over the embodiment of FIG. 5.

Figure 10:
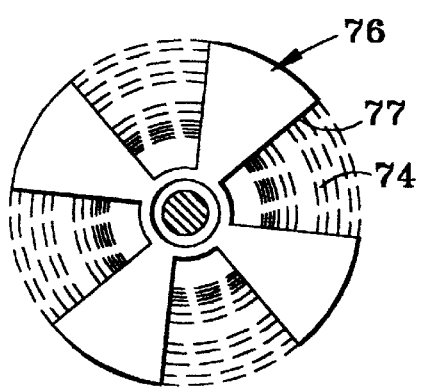
FIG. 10 is a top plan view of plate 76, shown in FIG. 9, relative to coil 74.
Figure 11:
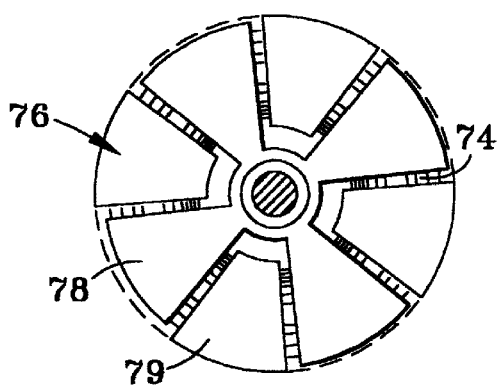
FIG. 11 is a bottom plan view of plate 78, shown in FIG. 9, relative to coil 74 and plate 76.

The embodiment of FIG. 9 employs an axially offset construction in which a coil 74 is offset axially from magnet 68. Flux reversal through coil 74 is implemented by stationary flux reversing flux plates 76 and 78 which are wrapped around coil 74 to create the structure shown in the top plan view of FIG. 10 and in the bottom plan view of FIG. 11. Each plate 76 and 78 is formed as a multi-arm, non-overlapping structure having respective spaced segments 77 and 79 which connect to a central cylinder 80 passing through the center of coil 74. Cylinder 80 may be attached to one of a pair of shaft bearings 82 (the other shaft bearing 84 being at an opposite end of the generator shaft 86. The steel flux path for one polarity is formed by flux plate 76 which wraps around coil 74 and connects to cylinder 80. The other flux plate 78 is positioned between coil 74 and magnet 68 and connects to tube or cylinder 80. Magnet 68 and backing plate 70 are affixed to shaft 86 so that rotation of the shaft creates a changing magnetic field through coil 74. Coil 74 and flux plates 76 and 78 remain stationary while magnet 68 rotates with driven shaft 86. A coil support 88 mounts the coil, flux plates 76 and 78, and bearing 82 to generator housing 90. In this embodiment, the ferromagnetic means for directing magnetic flux comprises flux plates 70,76 and 78, and tube 80.

Figure 12:
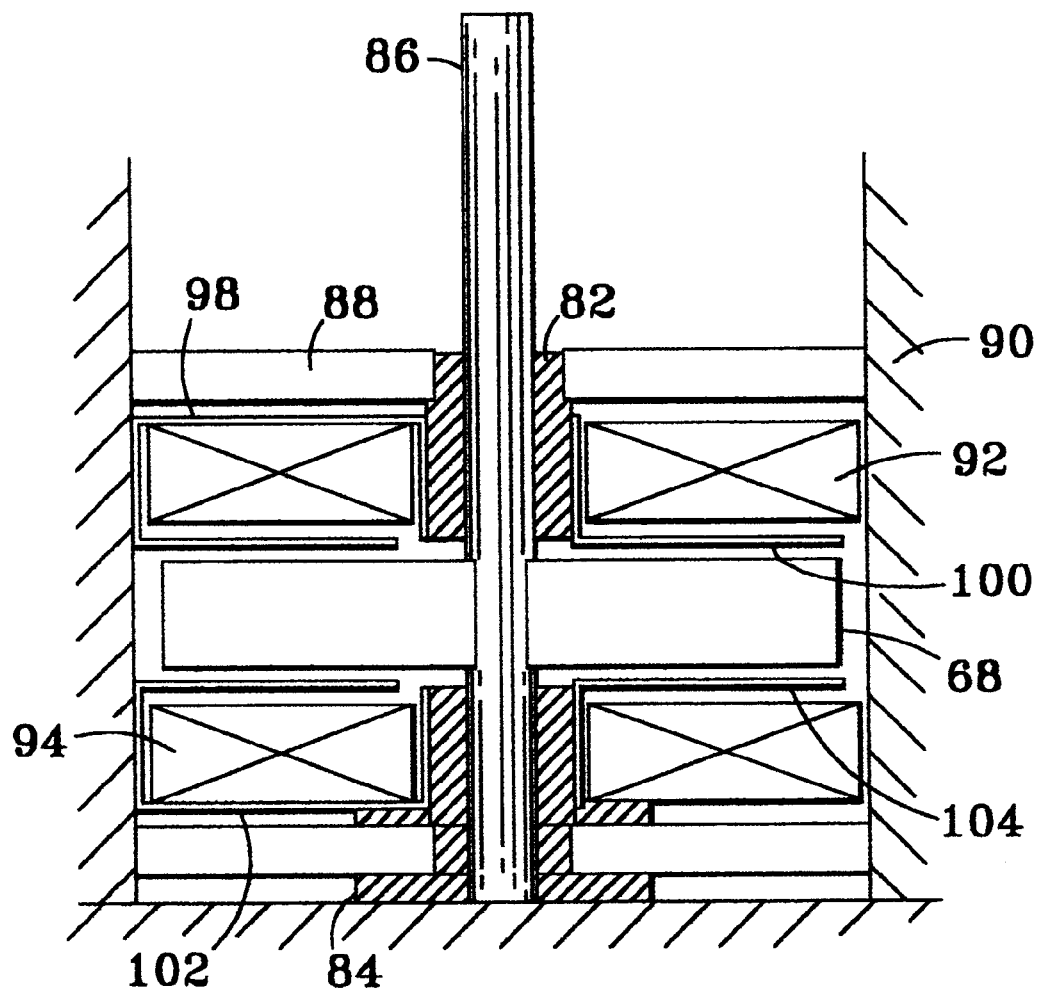
FIG. 12 is a schematic, cut-away side view of an ac generator in accordance with still another preferred embodiment of the invention.

In the embodiment of FIG. 12, a generator is implemented with a pair of stationary coils rather than a single coil as in FIG. 9. The structure of FIG. 12 differs from FIG. 9 in the removal of plate 70 and addition of a second coil 92. The remainder of the embodiment of FIG. 12 is substantially identical to the embodiment of FIG. 9 and the remaining elements of the generator are identified by identical reference numbers. The two coils 92 and 94 are mounted in the generator adjacent opposite surfaces of anisotropic magnet 68. Each coil 92 and 94 is associated with a separate pair of flux plates 98 and 100, and 102 and 104, respectively. Plates 98 and 100 correspond to, and are identical to, plates 76 and 78, respectively, associated with coil 74 in the embodiment of FIG. 9. Essentially, coil 92 is a dual of coil 74 of FIG. 9 so that this embodiment doubles the effective coil volume. Further, since there are now two coils on opposite sides of magnet 68, all 16 poles on the magnet are used. Two coils 92 and 94 can be connected in series circuit to double the voltage for a given frequency of rotation, or connected in parallel circuit to double the current, for a given torque.

While only certain preferred features of the invention have been illustrated and described, many modifications and changes will occur to those skilled in the art. It is, therefore, to be understood that the appended claims are intended to cover all such modifications and changes as fall within the true spirit of the invention.

What is claimed is:

1. An electric power generator comprising:

a housing;

a shaft mounted in said housing;

a first electrical coil positioned about said shaft;

a generally flat, annular, anisotropic magnet positioned about said shaft adjacent said coil, said magnet having a plurality of circumferentially distributed, alternating magnetic poles, each one of said poles at a radial location on one axial side of said magnet being of opposite polarity to a corresponding pole at said radial location on the opposite axial side of said magnet; and ferromagnetic means operatively associated with said magnet and said coil and having at least one position for concurrently overlaying all poles of a common polarity for establishing an alternating magnetic field through said coil as a function of rotation of at least one constituent of a group of constituents wherein a first constituent comprises said magnets, a second constituent comprises said coil and a third constituent comprises said ferromagnetic means.

2. The electric power generator of claim 1 wherein said anisotropic magnet is axially polarized.

3. The electric power generator of claim 2 wherein said electrical coil is disposed radially within said annular magnet.

4. The electric power generator of claim 3 wherein said ferromagnetic means comprises a pair of flux plates located adjacent opposite axial sides of said magnet and said coil, each of said flux plates having a plurality of radially extending, circumferentially spaced segments with said plates being oriented such that each segment of one plate is circumferentially aligned with a corresponding segment of another of said plates.

5. The electric power generator of claim 4 wherein said magnet and said coil are held stationary with respect to said housing and said flux plates are fastened to said shaft for rotation therewith.

6. The electric power generator of claim 2 wherein said magnet is axially displaced from and rotatable with respect to said coil.

7. The electric power generator of claim 6 wherein said ferromagnetic means comprises a backing plate overlaying a surface of said magnet opposite said coil, a first flux reversing plate having a plurality of radially extending, circumferentially spaced segments wrapped about said coil and a second flux reversing plate having a plurality of radially extending, circumferentially spaced segments interposed between segments of said first flux reversing plate on a surface of said coil adjacent said magnet.

8. The electric power generator of claim 7 wherein said coil is affixed to said housing and said magnet is affixed to said shaft for rotation therewith.

9. The electric power generator of claim 6 and including a second electrical coil axially displaced from said magnet and adjacent an opposite face thereof from said first electrical coil, and further including additional ferromagnetic means operatively associated with said second electrical coil for establishing an alternating magnetic field therein as a function of relative rotation between said magnet and said second electrical coil.

10. The electric power generator of claim 9 wherein each of said first and second coils are affixed to said housing and said magnet is affixed to said shaft for rotation therewith.

* * * * *